Dec. 19, 1933.　　　O. M. GLAHN ET AL　　　1,939,891
CONVEYER SYSTEM
Filed Dec. 22, 1930　　　4 Sheets-Sheet 1

Inventor
Otto M. Glahn
George A. Grassby Jr.
by Roberts, Cushman & Woodberry.
Attys.

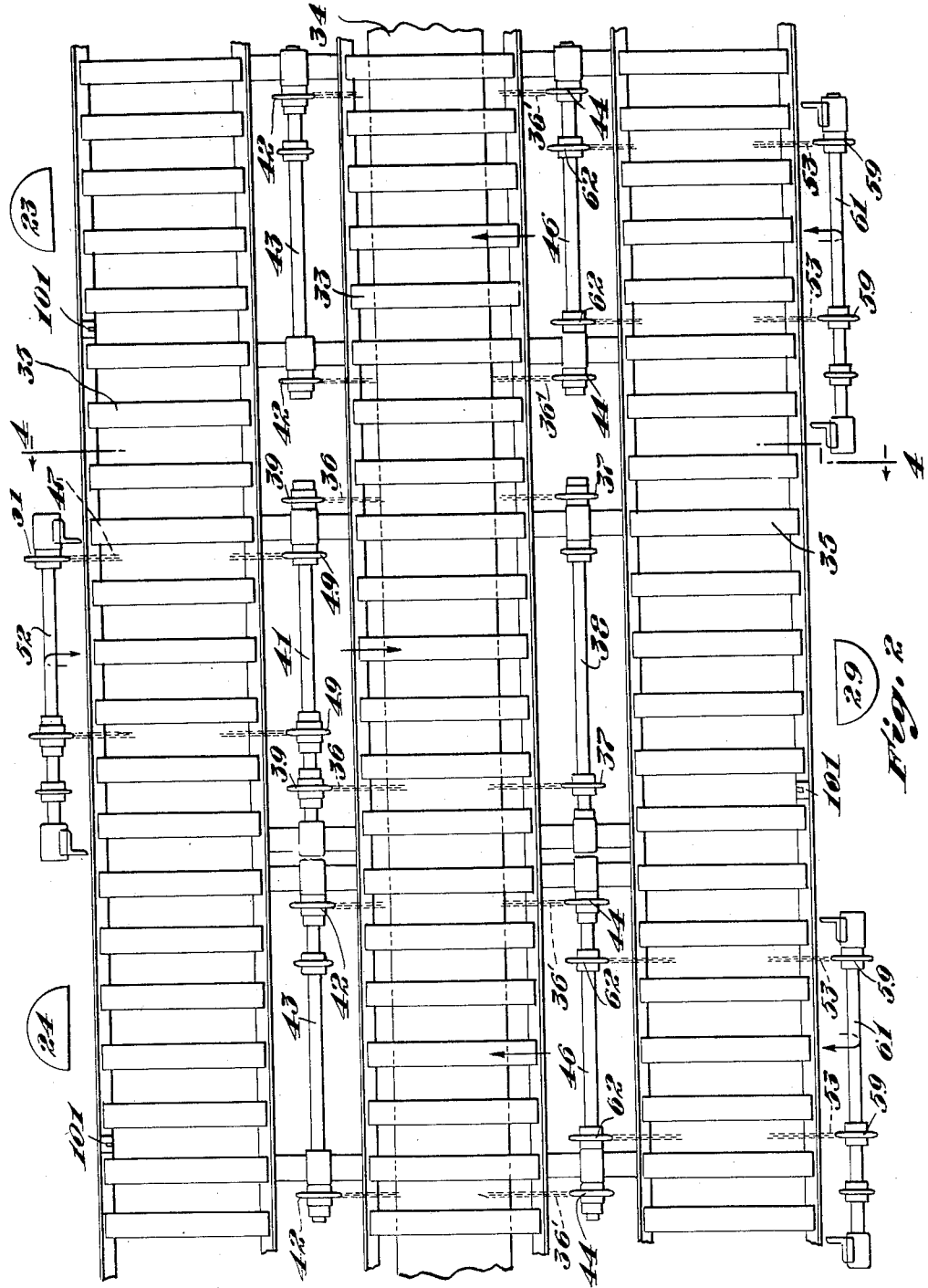

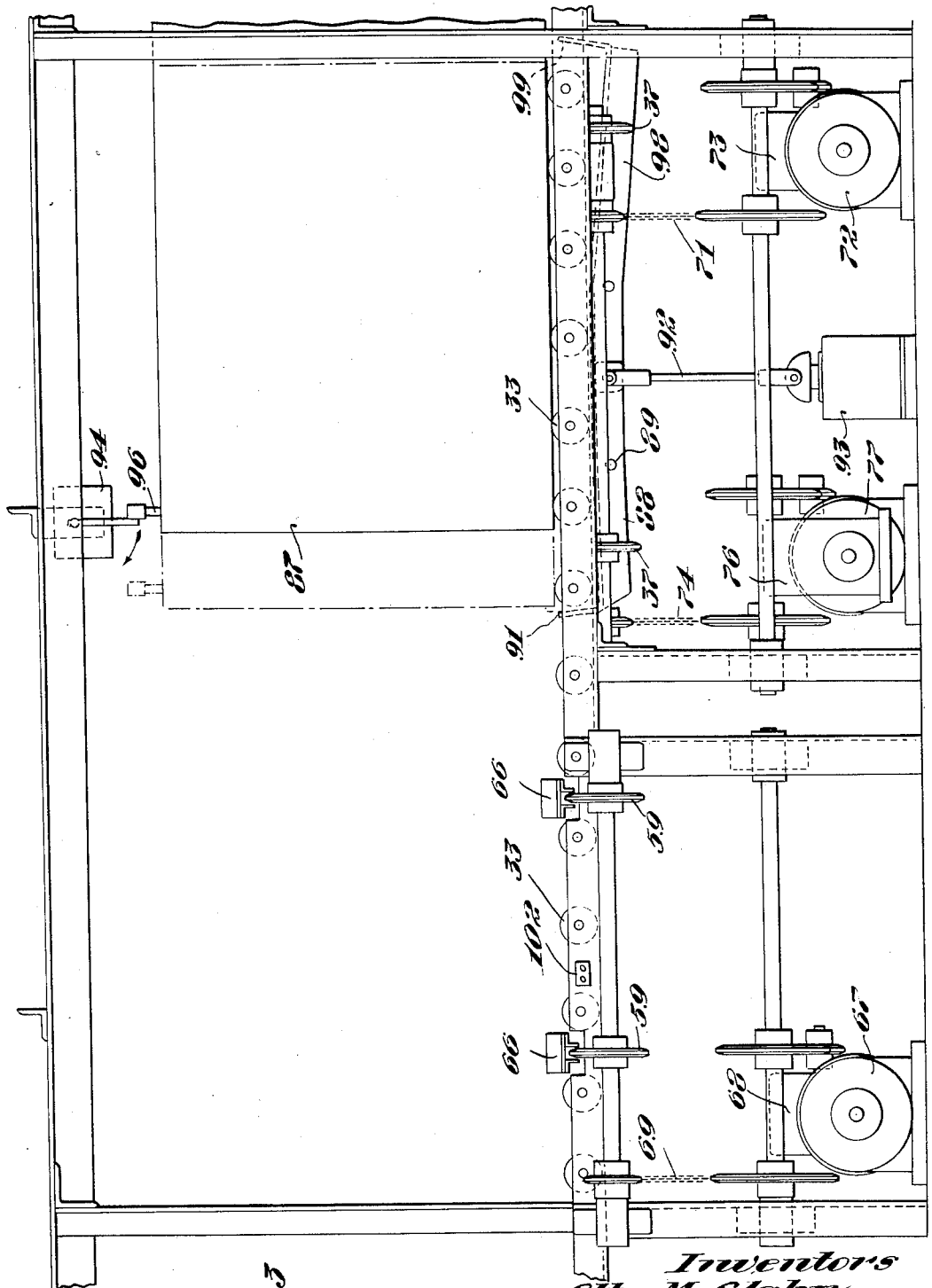

Dec. 19, 1933.   O. M. GLAHN ET AL   1,939,891
CONVEYER SYSTEM
Filed Dec. 22, 1930   4 Sheets-Sheet 4
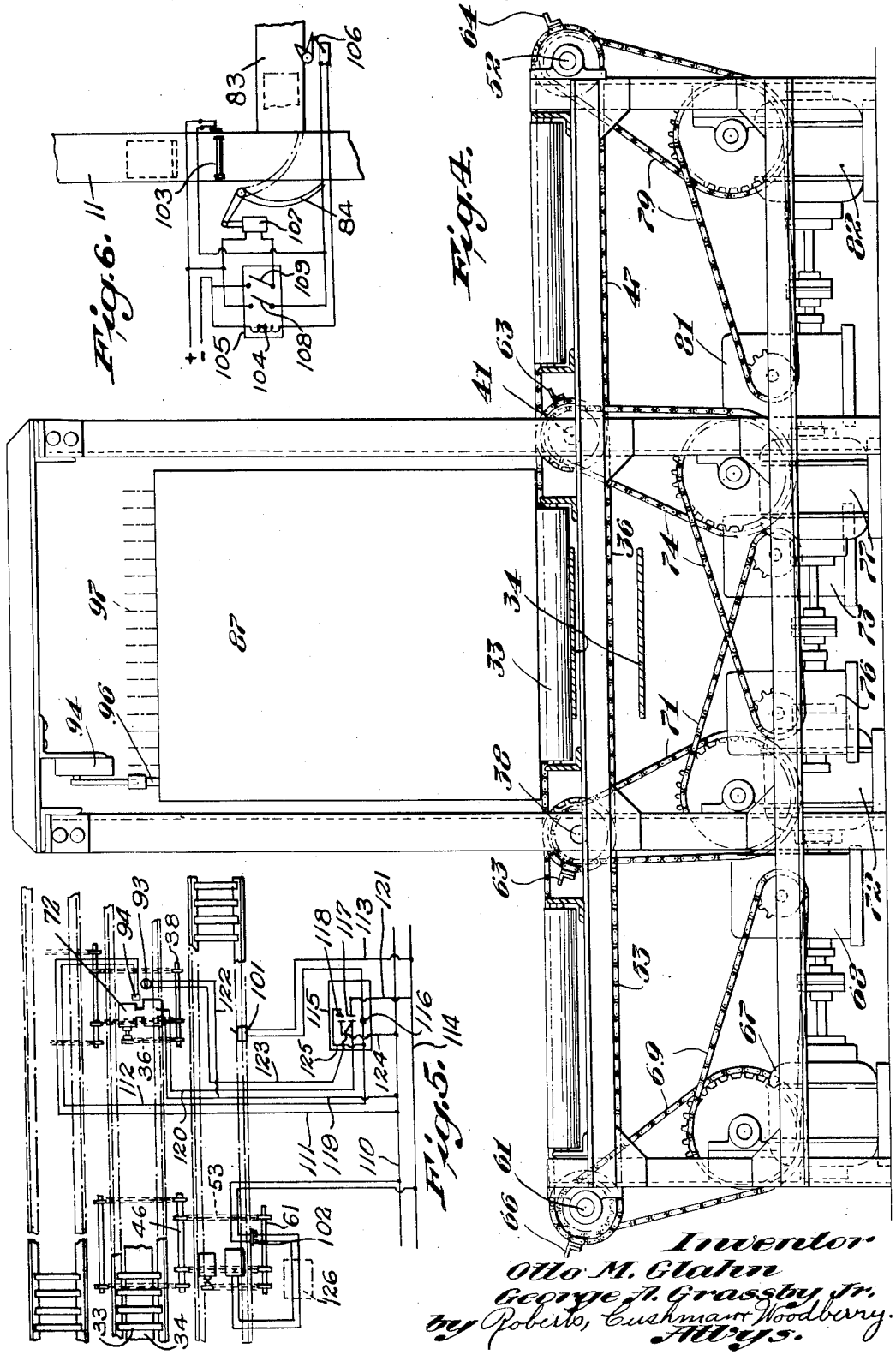

Patented Dec. 19, 1933

1,939,891

UNITED STATES PATENT OFFICE 1,939,891

CONVEYER SYSTEM

Otto M. Glahn, Syracuse, N. Y., and George A. Grassby, Jr., Newton Center, Mass., assignors to The Lamson Company, Syracuse, N. Y., a corporation of Massachusetts Application December 22, 1930
Serial No. 503,954

11 Claims. (Cl. 198—38)

This invention relates to the art of conveying articles to and from a main or other conveyer section and to a system for transporting material to various stations and for despatching material from such stations, as well as to means cooperating with a traveling article supporting surface for transferring articles transversely of the traveling surface and the method of so manipulating articles.

In systems of this general character it is often advantageous to transfer articles, without turning the same, in directions substantially at right angles to the direction of travel of such articles on a main conveyer. An arrangement of this kind effects a saving of space longitudinally of the main conveyer and is especially desirable where a number of operators' stations are disposed along the sides of the main conveyer. In such cases the articles may be transported with their greater axes disposed longitudinally of the conveyer and the latter need only be slightly wider than the articles. Moreover, as the articles not infrequently are quite large and rather cumbersome to handle it is also highly desirable that means be provided for delivering the articles to the operators' stations as well as for despatching articles therefrom with as little manual handling as possible.

Objects of the present invention are to improve the art of conveying articles by providing for transferring the same to and from a main conveyer in such a manner that an article may be transferred to the conveyer while another article is being removed from substantially the same portion of this conveyer and thereby to expedite the handling of articles; to improve the efficiency of systems of this kind by providing for effecting the transfer of articles or material with minimum expenditure of energy; to provide an improved system which is at least partly automatic in operation and capable of transporting articles to and from operators' tables located alongside a conveyer section, as well as for causing some of the articles to recirculate past the operators' tables while other selected articles are delivered to any predetermined station or stations; to provide article transfer apparatus of rugged, durable construction consisting of few moving parts which may be relatively light and inexpensive to manufacture; and also to provide apparatus of the class described having an improved construction and arrangement of parts.

In the drawings:

Fig. 2 is a top plan view of a portion of the system shown in Fig. 1;

Fig. 3 is an enlarged side elevation of a portion of the apparatus shown in Fig. 2;

Fig. 4 is a section taken substantially along the lines 4—4 of Figs. 1 and 2;

Fig. 5 is a diagrammatic view of the wiring at a typical station; and

Fig. 6 is a similar view of the wiring at a direction deflector.

Figure 1:
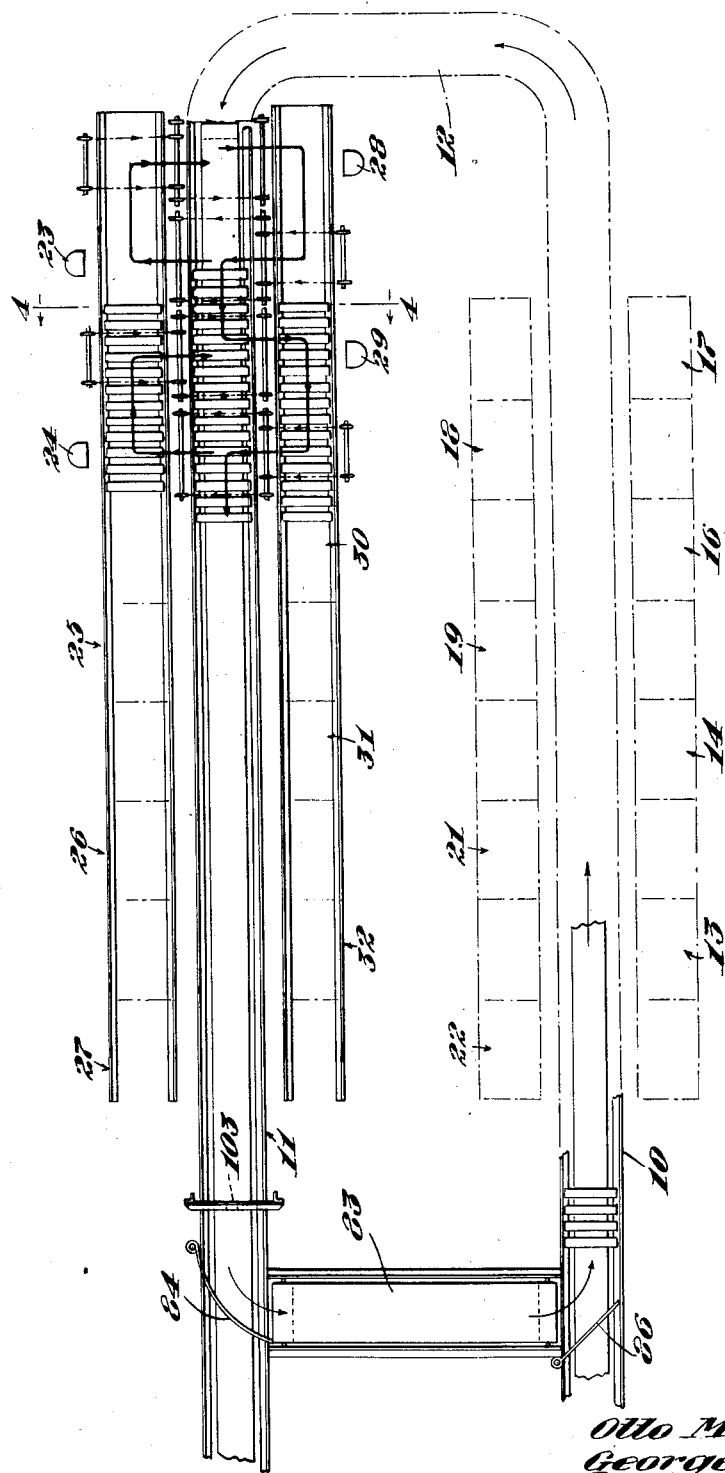
Fig. 1 is a diagrammatic view of a conveyer system.

In the embodiment of the invention selected for illustration as shown in Fig. 1, the conveyer system may comprise similarly disposed main conveyers 10 and 11 and an end conveyer 12 for transporting articles or material from the conveyer 10 to the conveyer 11. Each of the main conveyers preferably operates past a plurality of operators' stations. Thus the stations 13, 14, 16 and 17 are located along one side of the conveyer 10, while the stations 18, 19, 21 and 22 are disposed on the opposite side of this conveyer. Similarly the conveyer 11 operates between the stations 23, 24, 25, 26 and 27, disposed on one side thereof and stations 28, 29, 30, 31 and 32 disposed on the other side of this conveyer.

In order that articles may be transferred to and from these stations as expeditiously as possible, apparatus is provided for removing articles from the main conveyer to the station 28, for example, in a direction substantially at right angles to the direction of travel of the main conveyer. The delivered article is then moved longitudinally of the main conveyer at the station 28 and returned as indicated by the arrows at a point further along the main conveyer. Apparatus is also provided for removing an article from substantially the same portion of the conveyer 11 as that to which an article is returned from the station 28. Articles so removed are transferred to the station 23 and follow the course indicated by the arrows, being eventually returned to the conveyer 11 at a point substantially corresponding to that at which articles are removed to station 28. Articles destined for other stations follow similar courses, as indicated by the arrows at stations 23, 24, 28 and 29.

From the drawings it will be seen that the main conveyers 10 and 11 of this embodiment comprise live roller sections, and the operators' stations include idler rollers along which the articles may be moved manually parallel to the main conveyer. As shown in Fig. 4, the main conveyers include rollers 33 which are driven by a driving belt 34 engaging the lower surface of these rollers, and idler rollers 35 form the article supporting platforms of the operators' stations.

The transfer mechanism will be described with reference particularly to the main conveyer 11 and operators' stations 24 and 29. Flexible elements such as the chains 36 are spaced longitudinally of each main conveyer between the rollers 33 and slightly below the uppermost portions of these rollers. These chains are arranged in pairs and are spaced from each other longitudinally of the conveyer a distance somewhat less than the length of the articles to be handled. The chains 36 of the pair by which articles are transferred to station 29 are mounted on driving sprockets 37, which are fast on a driven shaft 38, and also on idler sprockets 39 which are loosely mounted on a rotatable shaft 41, the shafts being disposed on the opposite sides of the main conveyer. The chains 36' of the pair by which articles are transferred to station 24 are trained over driving sprockets 42 on a driven shaft 43 and also over idler sprockets 44 on a rotatable shaft 46. The chains of both pairs travel transversely of the conveyer in the directions of the arrows in Figs. 1 and 2.

At the operators' station 24 a pair of chains 47 are similarly spaced between the idler rollers 35 comprising the article supporting surface of the operators' stations. These chains are trained over idler sprockets 49 on the rotatable shaft 41 and also over driving sprockets 51 on the driven shaft 52. These chains 47 are operable toward the main conveyer 11 in a direction substantially at right angles to the course of travel of this conveyer. At station 29 a pair of chains 53 are similarly mounted on driving sprockets 59 on the driven shaft 61 and on idler sprockets 62 on the rotatable shaft 46. These chains are also operable in a direction toward the main conveyer.

As shown more clearly in Fig. 4, the chains 36 and 36' which travel between the rollers 33 of the main conveyer carry projections or flights 63 which are spaced longitudinally of the chains a distance greater than the width of articles to be conveyed, so that when the flights 63 are disposed at the sides of the main conveyer, as shown in Fig. 4, articles may pass freely along the upper traveling surface of this conveyer. The chains 47 and 53 are likewise provided with flights 64 and 66 respectively, which are similarly spaced longitudinally of these chains to permit articles to pass along the station platforms over the chains without interruption.

Power for operating the driven shaft 61 is provided by a motor reducer set comprising a driving motor 67 and a speed reducing unit 68 from which power is delivered through a chain drive 69 to the shaft 61. The driven shaft 38 receives power from a chain drive 71 driven by a motor 72 and a speed reducing unit 73. Shaft 43 is operated by a chain drive 74 from a speed reducing unit 76 and a driving motor 77, and the driven shaft 52 is likewise operated through a chain drive 79 from a speed reducing unit 81 driven by a motor 82.

It will be understood that the various parts thus far described with reference to stations 24 and 29 are also provided with each pair of opposed stations; and that the corresponding parts are arranged to operate in substantially the same manner as at the stations 24 and 29.

At a point beyond the end stations 27 and 32 are provided a conveyer 83 for transporting articles or material from the conveyer 11 to the conveyer 10 and movable deflectors 84 and 86, the first for guiding articles from the conveyer 10 onto the conveyer 83 and the second for directing articles from the conveyer 83 to the conveyer 10, thus making it possible to cause articles to recirculate through the system past the various operators' stations.

Means are provided at each transfer station to hold the article to be transferred to an operator's station, at rest and since a following article might contact with the first article before it is transferred, means are also provided to stop such article until the transfer is complete. A typical construction is shown in Fig. 3 wherein is illustrated a container 87 intended to be transferred to operator's station 29. An arm 88, mounted to pivot at 89, carries at one end an upwardly directed flange or abutment means 91 which is normally disposed between the rollers of the live roller section adjacent the edge of the driving belt 34 and is movable upwardly to project beyond the rollers 33 into the path of movement of articles on this conveyer for holding an article in position to be transferred by the transversely operable chains 36. At its other end, the member 88 is pivotally connected by a link 92 to a solenoid 93. The solenoid 93 may be energized by an electric circuit (not shown) which includes a circuit maker 94 mounted above the path of travel of articles or containers to be conveyed in position to be engaged by a projection such as the removable pin 96 carried by the container 87. As indicated by the dotted lines 97 (Fig. 4), this pin may be disposed in any one of a plurality of positions spaced transversely of the container. Unless a pin is disposed on a container in the position relative to the circuit maker shown in Fig. 4, the container will pass by the circuit maker 94 at the transfer station of Fig. 4 and continue its travel until the pin engages a circuit maker at another transfer station which is located for engagement with a pin in that particular position. On engagement of a pin 96 with the circuit maker the solenoid 93 is energized to move the member 88 about its pivot and thus to bring the abutment means 91 into the path of travel of articles. At the same time that the solenoid 93 moves the member 88 about its pivot it also moves a similarly mounted member 98 having an upwardly projecting flange 99 which holds the following articles from further forward movement until transfer of one article has been effected. Preferably the member 98 is connected to the solenoid by a pin and slot connection which causes it to move upwardly after the abutment means 91 has moved into the path of advance of articles on the live roller section.

The circuit maker 94 also completes the circuit to the driving motor 72 to cause the chains 36 to move transversely of the main conveyer and bring the flights or projections 63 thereof into engagement with a superposed article for pushing such article onto the receiving platform at station 29. As this article is moved fully onto the platform it comes into engagement with a circuit breaker 101 (Fig. 2) which breaks the motor circuit and also deenergizes the solenoid, causing the arm 88 and the abutment means 91 to drop to their normal positions so that other articles may pass uninterruptedly through this section of the main conveyer. Any article destined for this station, which might arrive while the circuit breaker 101 is tripped will of course continue its travel around the circuit until it returns to the transfer station. The pair of chains 47 or 53 by which articles are returned to the main conveyer are controllable at the will of the operators at the stations by means of manually operable push buttons or switches 102.

Referring to the diagrammatic view of one form of electric circuit shown in Fig. 5, the engagement of a pin 96 with the circuit maker 94 completes a circuit from main line 110 through lead 111, circuit maker 94, lead 112, circuit breaker 101, and lead 113 to main line 114. A motor starter 115 includes a coil 116 energized by the circuit thus set up and switches 117 and 118 which are closed when the coil 116 is energized. Closure of the switch 117 completes the motor circuit from line 110 through lead 119, motor 72 and leads 120 and 121 to line 114, and energizes the solenoid 93 through lead 122 from lead 119 and leads 123 and 121. The motor 72 thereupon causes the chains 36 and the flights 63 thereon to push the article onto the receiving platform and the solenoid 93 causes the abutment means 91 and the flange 99 to function all as set forth in detail above. The switch 118 completes a holding circuit through leads 124 and 125 so that the removal of the article from the circuit maker 94 will not break the circuits thus completed. When the article reaches the receiving platform it trips the circuit breaker 101 which opens the circuits in the well-known manner. When an article is to be returned to the main conveyer the button 102 is pressed to actuate the motor starter 126 and set the motor 67 in operation.

In the operation of the apparatus articles are delivered to the system on the conveyer 10 passing freely by the movable deflector 86 and between the various operator's stations. When the pin 96 carried by an article engages a circuit maker 94 having its arm depending into the path of the pin, the article is, by the mechanism above described, transferred to an operator's table where, after performing any desired operation, the operator moves the article along the table manually in the direction of the arrows, as explained with respect to stations 24 and 29. At a time when this article may be returned without interferring with the passage of other articles on the main conveyer, the operator pushes the button 102 disposed at his station to return the article to the main conveyer. Should it be desired to send this article to another station, this may be accomplished by changing the setting of the pin 96. If, on the other hand, the article is to be delivered elsewhere, the pin 96 is removed. As the article continues its course along the conveyer 11 it passes under a circuit maker 103 which will be actuated by a pin 96 in any position on the article. This circuit maker when actuated causes the deflector 84 to swing across the conveyer 11 so as to guide articles on to the conveyer 83 from whence they are directed by the movable deflector 86 onto the conveyer 10, and in this manner caused to recirculate. Articles moving along the conveyer 10 and not provided with a projecting pin 96 will continue their course of travel along the conveyer 11, the deflector 84 being inoperative, to any predetermined station or stations.

This operation of the deflector 84 through tripping the circuit maker 103 may be performed in any well-known manner, as for example that shown in Fig. 6. Here the circuit maker is located in a circuit through a coil 104 of a relay 105 and a circuit breaker 106, and the deflector 84 is actuated by a solenoid 107. When the circuit maker 103 is tripped the coil 104 is energized and the relay switches 108 and 109 are closed, establishing circuits through the solenoid 107 and through the circuit breaker 106 and the relay coil 104. When the deflector article passing along the conveyer 83 trips the circuit breaker 106, the circuit through the coil 104 is broken whereupon the switches 108 and 109 open and the deflector 80 is released.

It will be observed that in the apparatus disclosed the live roller section provides a traveling surface for supporting and conveying articles in a definite and substantially horizontal plane. The flexible elements or chains 36 are canveniently disposed between the rollers of the live roller section and the sprockets over which these chains are engaged have fixed axes of rotation. The bearings for these sprockets may therefore be rigidly mounted on the foundation structure. This assures a rugged and durable construction as well as one which is relatively inexpensive to maintain.

This not only saves the power which might otherwise be consumed, for example, in raising the flexible elements to a sufficient height to lift a superposed article above the traveling surface of the live roller section, but also does away with the necessity for any relatively large number of moving parts, such as those which might be required for raising and lowering the sprockets and the chains 36. Obviously in an apparatus of this character a considerable saving may be effected, even on a single installation, by the elimination of such moving parts, as they are necessarily quite large and cumbersome and also are usually disposed in a rather complicated arrangement which is expensive to maintain.

While in the apparatus disclosed the flexible elements 36 are shown as disposed normally below the articles to be transferred, it will be evident from this disclosure that many of the advantages of the present construction may be derived from similar apparatus having such flexible elements arranged in other positions, as for example, disposed above the articles to be transferred. In the latter case the projections or flights would depend from the flexible elements toward the live roller section for engagement with articles traveling thereon, and would be effective on engagement with such articles, as before, for pushing the same across the traveling surface without raising them above the plane of this surface. Also in this latter arrangement the flexible elements may readily be disposed in a diagonal or other oblique direction for moving articles in a direction other than one strictly at right angles to their path of travel on the live roller section. However, should this be desired, substantially this same objective may be attained with the apparatus disclosed by spacing certain rollers slightly farther apart to accommodate chains disposed at the desired angle or by making the rollers adjacent the chains shorter and also spacing them farther apart.

While one embodiment only of this invention has been shown and described in detail, it will be understood that we are not limited thereto and that other embodiments may be made without departing from the spirit and scope of the invention as set forth in the following claims.

We claim:

1. The combination with means providing a traveling surface for conveying articles in a given plane in one direction, of means for moving articles in said plane in another direction comprising elements movable in the latter direction below said plane, means carried by said elements and engageable with articles on the traveling surface for moving such articles across the traveling surface, abutment means movable into the path of articles traveling in said one direction for arresting the advance of articles in this direction, said abutment means being normally out of said path, and means actuated by certain of said articles for moving said abutment means into said path.

2. The combination with means providing a traveling surface for conveying articles in a given plane in one direction, of means for moving articles in said plane in another direction comprising elements movable in the latter direction below said plane, means carried by said elements and engageable with articles on the traveling surface for moving such articles across the traveling surface, abutment means normally out of the path of articles traveling in said one direction and movable thereinto for arresting the advance of articles in this direction, and means for simultaneously moving the abutment means into said path and for actuating said elements to move articles in said another direction.

3. Conveying apparatus comprising a live roller conveyer, flexible elements operable transversely of the conveyer and disposed between the rollers and below the article conveying surfaces thereof, flights on the flexible elements for engagement with articles on the conveyer, the flights being spaced longitudinally on the flexible elements a distance greater than the width of articles to be transported so that such articles may pass along the conveyer between the flights when the flexible elements are stationary, and means operable substantially simultaneously for arresting the advance of an article on the conveyer when such article is disposed above the flexible elements and for causing the flexible elements to move transversely of the conveyer whereby the flights may become effective for removing such article from the conveyer.

4. Conveying apparatus comprising a live roller conveyer, flexible elements operable transversely of the conveyer and disposed between the rollers and below the article conveying surfaces thereof, flights on the flexible elements for engagement with articles on the conveyer, the flights being spaced longitudinally on the flexible elements a distance greater than the width of articles to be transported so that such articles may pass along the conveyer between the flights when the flexible elements are stationary, and means operable substantially simultaneously by an article for arresting the advance of such article on the conveyer when the article is positioned above the flexible elements and for causing the flexible elements to move transversely of the conveyer, whereby the flights may become effective for removing the article from the conveyer.

5. Conveying apparatus comprising a live roller conveyer, flexible elements operable transversely of the conveyer and disposed between the rollers and below the article conveying surfaces thereof, flights on the flexible elements for engagement with articles on the conveyer, the flights being spaced longitudinally on the flexible elements a distance greater than the width of articles to be transported so that such articles may pass along the conveyer between the flights when the flexible elements are stationary, an article receiving platform alongside the conveyer, a member movable into the path of advance of articles on the conveyer for holding an article above the flexible elements in position for removal, means operable substantially simultaneously for moving the member into the path of advance of articles on the conveyer and for actuating the flexible elements to cause the flights thereof to push an article off the conveyer onto the receiving platform, and means operable by the article as it is advanced onto the receiving platform for causing the movable member to move out of the path of articles on the conveyer and for stopping the flexible elements.

6. Conveying apparatus comprising a live roller conveyer, flexible elements operable transversely of the conveyer and disposed between the rollers and below the article conveying surfaces thereof, flights on the flexible elements for engagement with articles on the conveyer, the flights being spaced longitudinally on the flexible elements a distance greater than the width of articles to be transported so that such articles may pass along the conveyer between the flights when the flexible elements are stationary, an article receiving platform adjacent the conveyer, a member movable into the path of advance of articles on the conveyer for holding an article above the flexible elements in position for removal, another member movable into the path of advance of articles for spacing succeeding articles during transfer of the first article, means operable substantially simultaneously for moving both of these members into the path of advance of articles on the conveyer and for actuating the flexible elements to cause the flights thereof to push an article off the conveyer onto the receiving platform, and means operable by the article as it is moved onto the platform for causing the movable members to move out of the path of articles on the conveyer and for stopping the flexible elements.

7. Conveying apparatus comprising a live roller conveyer, flexible elements operable transversely of the conveyer and disposed between the rollers and below the article conveying surfaces thereof, flights on the flexible elements for engagement with articles on the conveyer, the flights being spaced longitudinally on the flexible elements a distance greater than the width of articles to be transported so that such articles may pass along the conveyer between the flights when the flexible elements are stationary, and means operable by articles to be transported for causing the flexible elements to move transversely of the conveyer when an article is disposed on the conveyer in position to be engaged by the flights so that the latter may be effective for removing such article from the conveyer.

8. Conveying apparatus comprising a live roller conveyer, flexible elements operable transversely of the conveyer and disposed between the rollers and below the article conveying surfaces thereof, flights on the flexible elements for engagement with articles on the conveyer, the flights being spaced longitudinally on the flexible elements a distance greater than the width of articles to be transported so that such articles may pass along the conveyer between the flights when the flexible elements are stationary, means operable by articles to be transported for causing the flexible elements to move transversely of the conveyer when an article is in position to be engaged by the flights, an article receiving platform adjacent the conveyer, and means operable by an article as it is moved onto this platform for stopping the flexible elements.

9. Conveying apparatus comprising a live roller conveyer, flexible elements operable transversely of the conveyer and disposed between the rollers and below the article conveying surfaces thereof, flights on the flexible elements for engagement with articles on the conveyer, the flights being spaced longitudinally on the flexible elements a distance greater than the width of articles to be transported so that such articles may pass along the conveyer between the flights when the flexible elements are stationary, the flexible elements being spaced longitudinally of the conveyer in pairs, the elements of each pair being spaced from each other a distance less than the length of articles to be transported so that the flights of the elements of each pair may engage an article, and means operable selectively by the articles to be transported for operating the flexible elements of adjacent pairs in opposite directions.

10. Conveying apparatus comprising a live roller conveyer, flexible elements operable transversely of the conveyer and disposed between the rollers and below the article conveying surfaces thereof, flights on the flexible elements for engagement with articles on the conveyer, the flights being spaced longitudinally on the flexible elements a distance greater than the width of articles to be transported so that such articles may pass along the conveyer between the flights when the flexible elements are stationary, the flexible elements being spaced longitudinally of the conveyer in pairs, the elements of each pair being spaced from each other a distance less than the length of articles to be transported, means operable selectively by the articles to be transported for operating the flexible elements of adjacent pairs in opposite directions, article supporting platforms along the sides of the conveyer, and means on these platforms for returning articles to the conveyer at approximately the points of removal of articles therefrom, the returning means being arranged to return an article from one platform to the conveyer by moving such article in substantially the same direction in which an article is removed from this portion of the conveyer to the other platform, whereby one article may be returned to substantially the same portion of the conveyer from which an article is being removed.

11. Conveying apparatus comprising a live roller conveyer, flexible elements operable transversely of the conveyer and disposed between the rollers and below the article conveying surfaces thereof, flights on the flexible elements for engagement with articles on the conveyer, the flights being spaced longitudinally on the flexible elements a distance greater than the width of articles to be transported so that such articles may pass along the conveyer between the flights when the flexible elements are stationary, the flexible elements being spaced longitudinally of the conveyer in pairs, the elements of each pair being spaced from each other a distance less than the length of articles to be transported so that the flights of the elements of each pair may engage an article, means operable selectively by the articles to be transported for operating the flexible elements of adjacent pairs in opposite directions, and means operable selectively by the articles to be transported for causing some of these articles to recirculate on the live roller conveyer.

OTTO M. GLAHN.
G. A. GRASSBY, Jr.